United States Patent [19]

Asakawa

[11] 4,293,918
[45] Oct. 6, 1981

[54] DIGITAL DIFFERENTIAL ANALYZER WITH AN INCREMENT OUTPUT FUNCTION

[75] Inventor: Yukio Asakawa, Hitachiota, Japan

[73] Assignee: Hitachi, Ltd., Tokyo, Japan

[21] Appl. No.: 86,444

[22] Filed: Oct. 19, 1979

[30] Foreign Application Priority Data

Oct. 20, 1978 [JP] Japan .................................. 53-128487

[51] Int. Cl.³ ............................................. G06F 7/64
[52] U.S. Cl. ................................................... 364/702
[58] Field of Search ....................................... 364/702

[56] References Cited

U.S. PATENT DOCUMENTS

| | | | |
|---|---|---|---|
| 3,555,514 | 1/1971 | Hosaka et al. | 364/200 |
| 3,586,837 | 6/1971 | Hyatt et al. | 364/702 |
| 3,598,974 | 8/1971 | Lincoln | 364/702 |
| 3,601,591 | 8/1971 | Gaines et al. | 364/702 |
| 4,106,100 | 8/1978 | Okada et al. | 364/702 |

*Primary Examiner*—David H. Malzahn
*Attorney, Agent, or Firm*—Craig and Antonelli

[57] ABSTRACT

A digital differential analyzer has a Y register, an adder, an arithmetic logic unit, an R register, a logic circuit for producing increments, and incremental registers. These circuit components are controlled by a control unit storing previous programs. Another arithmetic/logic unit is provided which receives the data in the R register and increments.

The Y register converts the whole value data coming from the exterior of the digital differential analyzer into incremental data. When there is a difference between the data in the R register and the data in the Y register, an increment $\Delta z$ is produced and the increment $\Delta z$ is added to the content of the R register. The increment $\Delta z$ is successively outputted until the contents of the R register is equal to that of the Y register.

6 Claims, 9 Drawing Figures

FIG.6
| $C_1C_5$ \ $C_3C_4$ | 00 | 01 | 11 | 10 |
|---|---|---|---|---|
| 00 | 0 | 1 | X | 0 |
| 01 | 0 | 0 | X | X |
| 11 | 0 | 1 | X | 0 |
| 10 | 1 | 1 | X | X |
$\Delta Z_i'$
FIG.7
| $C_1C_5$ \ $C_3C_4$ | 00 | 01 | 11 | 10 |
|---|---|---|---|---|
| 00 | 1 | 1 | X | 0 |
| 01 | 1 | 1 | X | X |
| 11 | 1 | 1 | X | 0 |
| 10 | 1 | 1 | X | X |
$\Delta Z_i''$
FIG.8
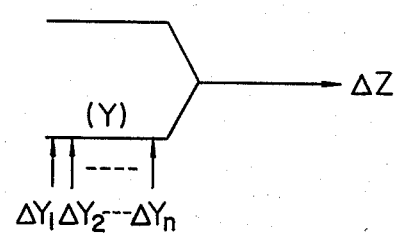
FIG.9
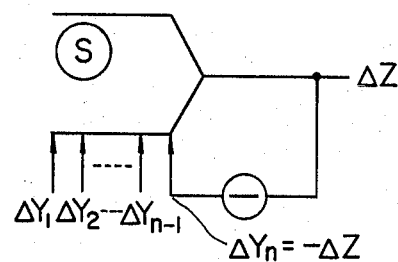

DIGITAL DIFFERENTIAL ANALYZER WITH AN INCREMENT OUTPUT FUNCTION

BACKGROUND OF THE INVENTION

This invention relates to a digital differential analyzer and more particularly to a digital differential analyzer of the kind in which the arithmetic operations for the differential analysis of data are performed in accordance with a stored program.

As is commonly known, the digital differential analyzer (DDA) is used to solve various linear and nonlinear differential equations at high speed and yet with a relatively high degree of precision and to produce signals representing complicated curves or complicated curved surfaces. The DDA basically performs an integrating operation but it can perform various kinds of operations when the operation logic contained therein is properly modified. Further, if the operation logic is controlled by a computer with a given stored program, as described in U.S. Pat. No. 3,555,514 entitled "Digital Computer Instruction Sequencing to Carry Out Digital Differential Analysis" and U.S. Pat. No. 3,274,376 entitled "Digital Differential Analyzer in Conjunction with a General Purpose Computer", a DDA arranged to perform proper processings of data can be designed. The DDA is a digital apparatus; however, if the operation logic thereof is properly controlled, it can serve as an operator with a function equivalent to that of an analog operator such as an integrator, a counter, an adder, a servo, and a decision maker. Accordingly, the processes controlled by a conventional analog operator may also be controlled by using the DDA with the operation logic controlled.

Compared with a control system exclusively used for analog operation, a control system using the DDA is inferior to the former in the response speed but superior to the same in accuracy of the control. Further compared with a control system using a usual digital computer for control, the DDA control system is comparable with the digital computer control in high accuracy in control but superior thereto in the response characteristic.

As described above, the DDA is useful in its performance, but the expression of input and output used in the operation of the DDA is different from that in the so-called general purpose computer (GPC) as follows:

Now assume that y is a time-variable quantity and z is a function of y, and that it is desired to obtain a value of z with variation of the value of y. Generally, any of the DDA and the GPC performs a specific operation repeatedly at a predetermined iteration timing in order to obtain such a value of z.

In the operation of the GPC, an instant value of y is latched at the beginning of each iteration cycle and subjected to a specific operation which directly produces the value of z corresponding to the input value of y. That is, in the GPC, inputs of $y_0, y_1, \ldots y_i$ are latched successively at the 0-th, 1st, 2nd, ... i-th iteration cycles, respectively, and as the results of the repeated operations, there are produced outputs of $z_0, z_1, \ldots z_i$, respectively.

On the other hand, the DDA uses, as inputs, $y_0, y_1-y_0, y_2-y_1, \ldots y_i-y_{i-1}$, respectively in the 0-th, 1st, 2nd, ... i-th iteration cycles, and produces, as outputs, $z_0, z_1-z_0, z_2-z_1, \ldots z_i-a_{i-1}$, respectively. Hereinafter, the value of such $y_0, y_1 \ldots$ or $z_0, z_1 \ldots$ will be called a whole value, while the value of such $y_1-y_0, y_2-y_1 \ldots$ or $z_1-z_0, z_2-z_1$ will be called a value of an increment or simply an increment. For this reason, it is troublesome in its handling in practical use. More specifically, when the DDA is used with an automatic process control system, it is required to apply to the DDA operator only increments extracted from a whole value of each of various signals obtained from the process and to accumulate the increments resulting from its operation thereby to reconstruct the whole value to be applied as a control signal to the process.

Of those problems, the reconstruction of the whole value from increments, or the conversion of the increments into the whole value can be easily realized by using the contents of an integrand register, as called hereinafter "Y register", of the DDA which stores an integrand y, since the Y register holds an accumulation of increments operated. The problem to still be solved is how to obtain increments of various signals accurately and simply. The techniques so far proposed are: to provide hardware between the process and the DDA for producing increments of whole values of various signals from the process; or to input whole values of various signals from the process, as integrands y into the Y registers of a specific DDA operator thereby producing integration of y with respect to time, which is applied to a y increment generator composed of a combination of specific DDA operators so as to produce the increments.

The former technique is uneconomical because of use of the special and additional hardware and, when the number of signals from the process from which increments are derived are large, the additional hardware may be more expensive than the DDA proper. Also, an increased number of parts of the hardware which necessarily causes the reliability to degrade is undesirable for the process control system which inherently needs a fairly higher reliability.

The latter technique needs a plurality (e.g. 3 to 4) of DDA operators. Further, it is difficult to stably obtain increments when the control system is designed with an intention of a high response speed. Conversely, when the system is designed so as to stably obtain increments, the response speed is slow. Thus, it is very difficult to obtain an optimum compromise between the requirements of stable increment derivation and high speed response.

SUMMARY OF THE INVENTION

In order to eliminate the defects of the prior arts, the invention provides a DDA having a function of converting a whole value into an increment value.

BRIEF DESCRIPTION OF THE DRAWINGS

FIGS. 6 and 7 show Karnaugh maps for studying a construction of a part of the logic circuit shown in FIG. 2.

FIGS. 8 and 9 show the symbols for illustrating the addition function of the DDA according to the invention and that of the conventional DDA.

DESCRIPTION OF THE PREFERRED EMBODIMENT

Figure 1:
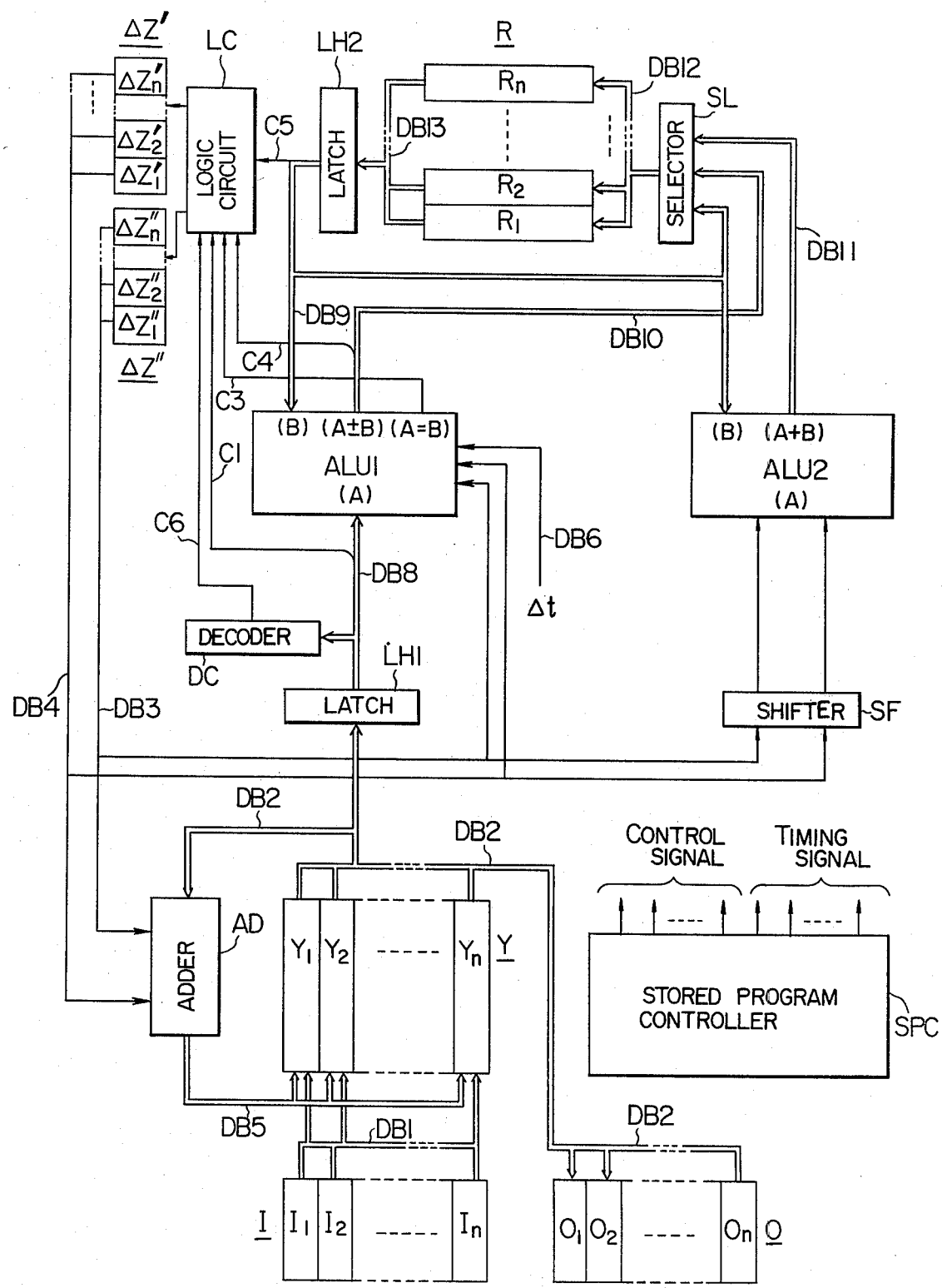
FIG. 1 shows a block diagram of an embodiment of a DDA according to the invention.

FIG. 1 shows a block diagram of a DDA which is an embodiment according to the invention. In FIG. 1, input units $I_1$ to $I_n$ receive input signals in a given format from a process to be controlled (not shown). Y registers $Y_1$ to $Y_n$ are coupled with the input units $I_1$ to $I_n$, by way of a data bus $DB_1$. An adder AD is coupled with the Y register $Y_1$ to $Y_n$ by way of a data bus $DB_2$, and to an incremental register (referred to as "$\Delta Z''$" register"), as described later and an incremental sign register (referred to as "$\Delta Z'$ register"), as also described later, by way of data buses $DB_3$ and $DB_4$. The output of the adder AD is coupled with the Y register via a data bus $DB_5$. A latch register $LH_1$ latches the data in a given Y register at a given timing under control of a control unit SPC. A decoder DC produces logic '0' onto a signal line $C_6$ only when the data latched in the Y register is 0 and produces logic '1' when the data takes any other value. An arithmetic logic unit $ALU_1$ receives the output of the latch register $LH_1$ via a data bus $DB_8$, the output of a latch register $LH_2$ which latches any one of the data in R registers $R_1$ to $R_n$ via a data bus $DB_9$, increment data via data buses $DB_3$ and $DB_4$, and a signal for providing an increment $\Delta t$ to effect a time integration through a data bus $DB_6$, respectively, and performs a given operation under control of the control unit SPC. A bit shifter SF shifts the incremental data coming through the data bus $DB_3$ to a bit position to which the incremental data is added in accordance with a signal from the control unit SPC which indicates the bit position of the data latched in the latch register $LH_2$ to which the incremental data is added. Another arithmetic logic unit $ALU_2$ performs a given operation of a signal applied thereto in accordance with a control signal delivered from the control unit SPC. A selector SL receives the output of the latch $LH_2$ through the data bus $DB_9$, and the add/substraction outputs of the arithmetic logic units $ALU_1$ and $ALU_2$ through the data buses $DB_{10}$ and $DB_{11}$, respectively, and selects one of them under control of a signal applied from the control unit SPC. The R registers $R_1$ to $R_n$ are coupled with the selector SL through a data bus $DB_{12}$. The R register and the latch register $LH_2$ are coupled with each other through a data bus $DB_{13}$. A logic circuit LC serves as a $\Delta Z$ increment generator, receiving the signal $C_6$ from the decoder DC and further signals $C_1$ to $C_3$ to $C_5$. In those signals, signals $C_1$ and $C_5$ represent sign bits of the data latched in the latch registers $LH_1$ and $LH_2$. The signal $C_3$ becomes logic '1' when the data of the latch registers $LH_1$ and $LH_2$ are equal to each other, i.e. when A=B holds. The signal $C_4$ designates a sign bit of the operation result of $A \pm B$. $\Delta Z'$ and $\Delta Z''$ are the $\Delta Z$ and $\Delta Z'$ registers which operate in accordance with the output of the logic circuit LC and a control signal from the control unit SPC. Output units $O_1$ to $O_n$ produce the data held in the Y register as a process control signal under control of a signal from the control unit SPC. The control unit SPC stores a predetermined program for performing a given function of the DDA to issue necessary control signals and timing signals.

Figure 3:
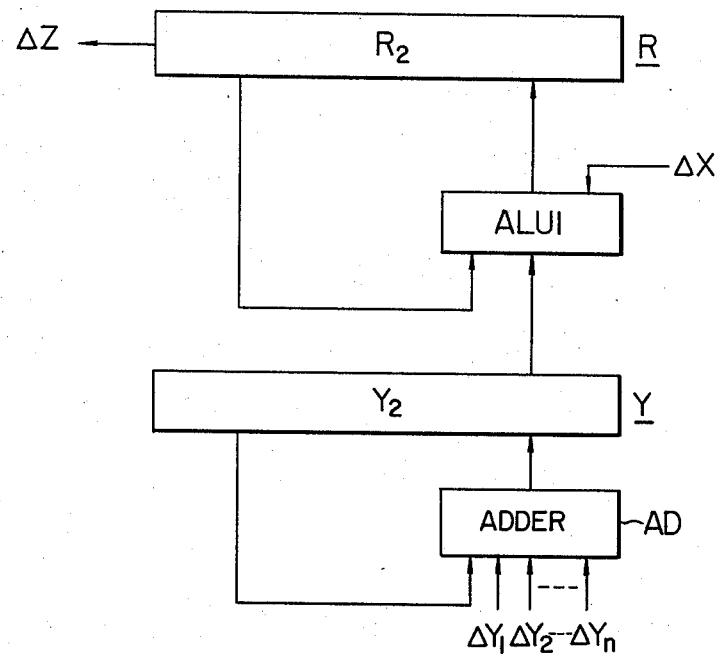
FIG. 3 shows an equivalent block diagram for explaining the operation of an integrator.

On the basis of the aforementioned construction of the DDA, the operation of the DDA, when it acts as an integrator which is the basic function of the DDA, will be described briefly. Let it be assumed that the Y register $Y_2$ and the R register $R_2$ are used. The control unit SPC delivers commands for the use of those registers to the related components of the DDA, so that the related gates of the data buses associated with the components are controlled at given timings. As a result, the DDA operates with a function of an equivalent circuit as shown in a block diagram of FIG. 3. As shown, the circuit is comprised of an adder AD, the arithmetic and logic unit $ALU_1$ (it basically operates as an adder, in this case), the Y register $Y_2$ storing the result of the operation by the adder AD and the R register $R_2$ storing the result of the operation by the unit $ALU_1$. As shown, the circuit does not use the unit $ALU_2$ in this case. In the figure, $\Delta y_1$ to $\Delta y_n$ are minute increments (referred to as input increments) of n input variables. At the ith operation, the following integrand y is stored in the Y register $Y_2$ $$y_i = y_{i-1} + \Delta y_{1i} + \Delta y_{2i} + \ldots + \Delta y_{ni} \quad (1)$$
$$= y_{i-1} + \sum_{k=1}^{n} \Delta y_{ki}$$

where a suffix i designates a value of the result of the i-th operation and i−1 designates a value of the operation result of the (i−1) operation preceding to the i-th operation.

In accordance with the equation (1), the increments of input variables are accumulated, and the result is stored as a whole value of the integrand y in the $Y_2$ register.

An integral I of the integrand y with respect to an integral independent variable x can be obtained according to the well-known method of piecewise mensulation. That is, the integral I of a curve y=f(x) can approximately be given by the equation $$I_i = \sum_{j=1}^{i} y_j \Delta x_j = \sum_{j=1}^{i-1} y_j \Delta x_j + y_i \Delta x_i \quad (2)$$
$$= I_{i-1} + y_i \Delta x_i$$

where $I_1$ indicates the integration from the first to the i-th division and $y_i \Delta x_i$ indicates the measurement of the i-th division.

In the equation (2), if the value of $\Delta x$ is sufficiently small, an integral with a sufficient accuracy in practical use can be obtained. Assuming that u is the minimum quantitized unit of the integral independent variable x and, $\Delta x$ is defined as follows:

when x increases by u, $\Delta x_i = +1$
when x decreases by u, $\Delta x_i = -1$
when a change of x is below u, $\Delta x_i = 0$ then, the equation (2) is when $\Delta x_i = +1$, $I_i = I_{i-1} + y_i$ when $\Delta x_i = -1$, $I_i = I_{i-1} - y_i$ when $\Delta x_i = 0$, $I_i = I_{i-1}$ \quad (3)

Therefore, a multiplier for calculating $y_i \Delta x_i$ in the equation (2) may be omitted by using a control pulse, in place of $\Delta x_i$, for controlling the operation. The operation of the equation (3) is performed by the arithmetic logic unit $ALU_1$ shown in FIG. 3 under control of the $\Delta x_i$ pulse. The integrated value $I_i$ is stored in the R register $R_2$ as $r_i$. Since the capacity of the R register $R_2$ is finite, however, an overflow might occur in the R register $R_2$. Hence, $y_1$ and $r_i$ are constrained within scopes $-1 \leq y_i < +1$ and $0 \leq r_i < +1$, respectively, and the overflows thereof are related to the increment $\Delta z_i$ of the output variable as follows:

$$\left.\begin{array}{l} r_{i-1} + y_i \geqq 1 \rightarrow z_i = +1 \\ 0 \leqq r_{i-1} + y_i < 1 \rightarrow \Delta z_i = 0 \\ r_{i-1} + y_i < 0 \rightarrow \Delta z_i = -1 \\ r_i = r_{i-1} + y_i - \Delta z_i \end{array}\right\} \quad (4)$$

As seen from the equation (4), when the value $r_{i-1}+y_i$ to be stored in the R register $R_2$ is above 1, the increment of $\Delta z_i=+1$ is produced and the value of overflow (remainder) exceeding $+1$ is loaded as $r_i$ in the R register $R_2$. When $0 \leqq r_{i-1}+y_i<1$ which is within the limitation of value to be stored in the R register $R_2$, the value of $r_{i-1}+y_i$ is stored as $r_i$ in the R register $R_2$ and $\Delta z_i$ is made 0, i.e. $\Delta z_i=0$. When $r_{i-1}+y_i$ is smaller than 0, $\Delta z_i=-1$ is outputted and $r_{i-1}+y_i+1\geqq 0$, i.e. difference between $r_{i-1}+y_i$ and $-1$, is loaded as $r_i$ to the R register $R_2$. $\Delta z_i$ is a pulse representing a quantitized increment having a weight of u and is used as $\Delta x_i$ and $\Delta y_i$ to another DDA operator. In other words, the data in the $\Delta z$ register and $\Delta z''$ register are introduced into the adder AD and the unit $ALU_1$, via the data buses $DB_3$ and $DB_4$, respectively, and are used as increments.

Figure 4:
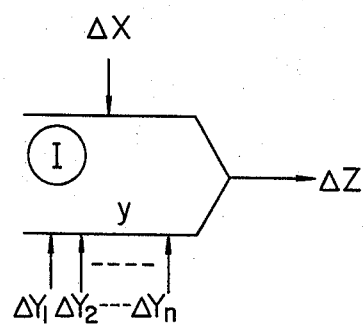
FIGS. 4 and 5 show the symbols of an integrator and a servo which are constructed by DDAs.

When the DDA operates as an integrator, it is represented by a symbolic presentation as shown in FIG. 4 and the integral operation logic is arranged in the following $$y_i = y_{i-1} + \sum_{k=1}^{n} \Delta y_{ki}$$

$$r_{i-1}+y_i \geqq 1 \rightarrow \Delta z_i = +1$$

$$0 \leqq r_{i-1}+y_i < 1 \rightarrow \Delta z_i = 0$$

$$r_{i-1}+y_i < 0 \rightarrow \Delta z_i = -1$$

$$r_i = r_{i-1}+y_i - \Delta z_i$$

Figure 5:
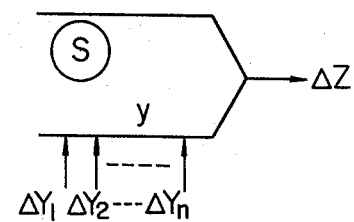

When it operates as a servo, it is symbolized as shown in FIG. 5 and the operation logic of $y_i$ is defined by the equation (1) as in the case of the integrator. The operation logic of $\Delta z_i$ is independent of $\Delta x_i$ and $r_i$, and defined by $$\left.\begin{array}{l} y_i > 0 \rightarrow \Delta z_i = +1 \\ y_i = 0 \rightarrow \Delta z_i = 0 \\ y_i < 0 \rightarrow \Delta z_i = -1 \end{array}\right\} \quad (5)$$

The equation (5) implies that, so long as $y_i \neq 0$, $\Delta z_i$ pulse is exclusively dependent on the sign of $y_i$. Such as operation logic is realized in such a manner that, either $\Delta z_i=+1$ or $\Delta z_i=-1$ is determined depending on a state of a sign bit representing a sign of $y_i$ in the Y register and the condition of $\Delta z_i=0$ is determined by detecting a bit state of each digit of the Y register. Therefore, the increment $\Delta z_i$ may be formed by the logic circuit LC on the basis of the output signal $C_6$ of the decoder DC shown in FIG. 1 and the signal $C_1$ of the sign bit of the Y register latched in the latch $LH_1$. In other word, when the DDA operates as a servo, it is enough to perform the control as mentioned above by the control unit SPC.

As described above, the DDA commonly uses the adder AD, the arithmetic logic unit $ALU_1$, and the logic circuit LC, and controls a number of registers under control of the control unit SPC so as to satisfy the objects and the characteristics of the process control. In this way, the DDA digitally realizes the same control function as that of the conventional analog control device. As described above, however, the DDA must extract increments from the whole value of various signals from the process, and this task is troublesome.

The present invention is to provide a DDA capable of providing increments from the whole value. To achieve this function, the DDA is provided with an additional arithmetic logic unit $ALU_2$ and operates in the following manner.

When the increment request is issued from the control unit SPC, an input signal from the signal point of the process from which the increments are extracted is introduced through the input unit I, for example, $I_1$, to the Y register $Y_1$. Then, $y_i$ and $r_{i-1}$ are read out from the Y register $Y_1$ and the R register $R_1$, respectively, and then are loaded into the latch registers $LH_1$ and $LH_2$ to set the A and B inputs of the arithmetic logic unit $ALU_1$. Simultaneously, $r_{i-1}$ is set to the B input of the arithmetic logic unit $ALU_2$. In the next step, the control unit SPC directs the arithmetic logic unit $ALU_1$ to caulculate $A-B$ i.e. $y_i-r_{i-1}$ and judge whether $A=B$ or $A \neq B$. If $A=B$, the unit $ALU_1$ produces a state judge signal $C_3=1$. Depending on the states of $C_1$ and $C_3$ to $C_5$, the control unit SPC directs the logic unit LC to judge whether $y_i>r_{i-1}$, $y_i=r_{i-1}$, or $y_i<r_{i-1}$. On the basis of the judgement, the logic circuit LC produces $\Delta z_i$ pulse as described in detail later. $\Delta z_i$ is set to the A input of the arithmetic logic unit $ALU_2$ through the shifter SF. In this case, the shifter SF, according to the command from the control unit SPC, shifts the $\Delta z_i$ pulse to a digit position in the A input where the $\Delta z_i$ pulse has a weight u and then sets it therein. The control unit SPC instructs the arithmetic logic unit $ALU_2$ to calculate $A+B=u+r_{i-1}$ and loads the result of the calculation as $r_i$ into the R register $R_1$ by way of the selector SL. At this step of the operation, a first cycle of the operation is completed.

The explanation will be given of how $\Delta z_i$ is set to the A input of the arithmetic logic unit $ALU_2$, together with the construction of the logic circuit LC.

For convenience of explanation, the following condition or assumption is set up:

(1) Scope of y and r: $-1 \leqq y < 1$, $-1 \leqq r < 1$ (2) Expression of y and r: Binary expression of 16 bits, a negative number is represented by a complement of 2 and a sign is given by the most significant bit. Accordingly, the minimum quantitized unit is $2^{-15}$.

$$\begin{array}{ll} C_1; \ y_i \geqq 0 \rightarrow C_1 = 0 & (3) \\ \quad y_i < 0 \rightarrow C_1 = 1 & \\ C_3; \ y_i = r_{i-1} \rightarrow C_3 = 1 & (4) \\ \quad y_i \neq r_{i-1} \rightarrow C_3 = 0 & \\ C_4; \ y_i - r_{i-1} \geqq 0 \rightarrow C_4 = 0 & (5) \\ \quad y_i - r_{i-1} < 0 \rightarrow C_4 = 1 & \\ C_5; \ r_{i-1} \geqq 0 \rightarrow C_5 = 0 & (6) \\ \quad r_{i-1} < 0 \rightarrow C_5 = 1 & \\ \Delta z \text{ is expressed by two bits.} & (7) \\ \Delta z_i'' = \Delta z_i' \Delta z_i & \\ \Delta z_i'' = +1 \rightarrow \Delta z_i' = 0, \Delta z_i = 1 & \\ \quad \therefore \Delta z_i = 01 & \end{array}$$

-continued $$\Delta z_i'' = 0 \rightarrow \Delta z_i' = 0, \Delta z_i = 0$$
$$\therefore \Delta z_i = 00$$
$$\Delta z_i'' = -1 \rightarrow \Delta z_i' = 1, \Delta z_i = 1$$
$$\therefore \Delta z_i = 11$$

Under these conditions (1) to (7), the logic circuit LC is so designed as to produce an increment $\Delta z$ in accordance with the logic of increment output operation defined as follows:

$$\left.\begin{array}{l} y_i > r_{i-1} \rightarrow \Delta z_i = +u, \quad r_i = r_{i-1} + u \\ y_i = r_{i-1} \rightarrow \Delta z_i = 0, \quad r_i = r_{i-1} \\ y_i < r_{i-1} \rightarrow \Delta z_i = -u, \quad r_i = r_{i-1} - u \end{array}\right\} \quad (6)$$

In the above equation, $\Delta z_i$ is expressed by the unit u obtained by quantitizing y and r; however, the expression is the same as that in which $\Delta z_i$ is expressed in terms of incremental pulses $+1$, $0$, and $-1$ each having a weight u. According to this logic, when y changes from $y_{i-1}$ to $y_i$, $y_i$ is given by $$y_i = y_{i-1} + \Delta y_i \quad (7)$$

where $\Delta y_i$ is an increment. $\Delta y_i$ is expressed in terms of u $$\Delta y_i = u \cdot m \quad (8)$$

where m is an integer. In the operation of the incremental output operation, from the i-th iteration to the $(i+m-1)$th iteration, a total of m incremental pulses $\Delta z$ having a weight u are outputted, while r is corrected by u every iteration to finally be $y = r$ at the $(i+m-1)$th iteration.

A generation rule of the increment $\Delta z$ is shown in Table 1. At No. 1 the states of $y_i \leq 0$ and $r_{i-1} \leq 0$ are established and hence $C_1 = 0$ and $C_5 = 0$ are given in accordance with the above conditions (3) and (6). Due to $r_{i-1} - y_i$, $C_3 = 0$ and $C_4 = 0$ are given in accordance with the conditions (4) and (5). Further, in accordance with the equation (6) of the definition of the incremental output operation logic and the condition (7) of the $\Delta z_i$, $\Delta z_i' = 0$ and $\Delta z_i'' = 1$ are held.

Other conditions are obtained in the same manner. Since the arithmetic logic units $ALU_1$ and $ALU_2$ calculate the values within the scope defined by the condition (1), when the result of $y_i - r_{i-1}$ is below $-1$ or not less than 1, the sign bit $C_4$ of the output signal of the arithmetic logic unit $ALU_1$ does not satisfy the condition (5). This situation correspondings to those in the columns (8) and (9) in Table 1. Let us consider the logic circuit LC to satisfy the generation rule shown in Table 1 even in such a situation. The Karnaugh maps relating to $\Delta z_i'$ and $\Delta z_i''$ prepared on the basis of Table 1 are shown in FIGS. 6 and 7. As known, the Karnaugh map is used to express $\Delta z_i'$ and $\Delta z_i''$ in terms of $C_1$, $C_3$, $C_4$ and $C_5$ in accordance with the Boolean algebra. In FIG. 6, a cross-point between a column of $C_1C_5 = 00$ and a row of $C_3C_4 = 00$ designates a state of $\Delta z_i'$ in No. 1 in Table 1. This is correspondingly applied to other situations.

In accordance with the maps of FIGS. 6 and 7, $\Delta z_i'$ and $\Delta z_i''$ are expressed by $$\Delta z_i' = \overline{C}_3 \{C_4(C_1C_5 + \overline{C}_1\overline{C}_5) + C_1\overline{C}_5\} \quad (9)$$

$$\Delta z_i'' = \overline{C}_3 \quad (10)$$

Figure 2:
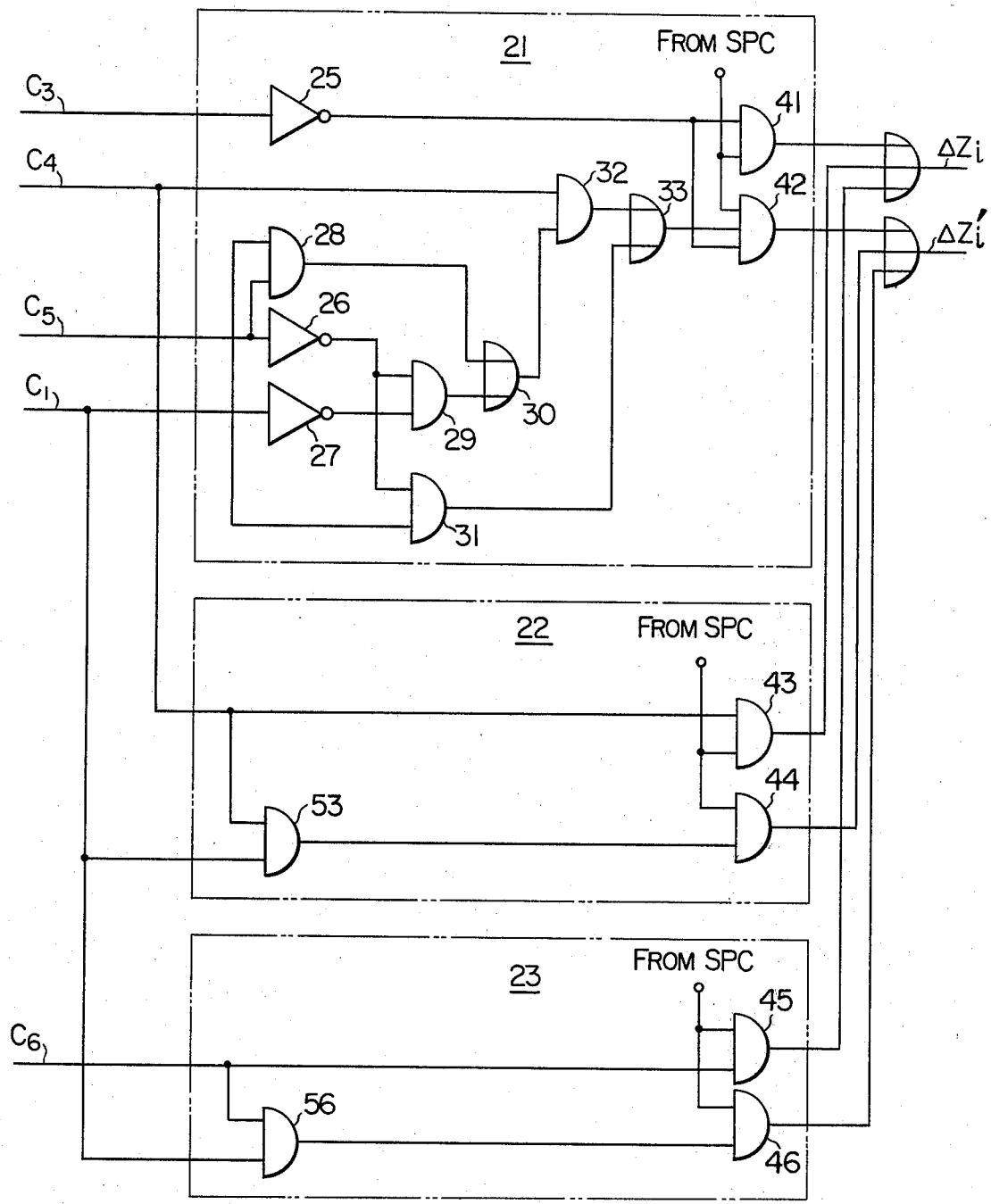
FIG. 2 shows a circuit diagram of a logic circuit as an example used in the circuit in FIG. 1.

In the equation (9), $\overline{C}_3$ is a logic NOT of $C_3$, $C_1C_5$ is a logic AND of $C_1$ and $C_5$, and $\overline{C}_1\overline{C}_5 + C_1C_5$ is a logic OR of $C_1C_5$ and $\overline{C}_1\overline{C}_5$. Accordingly, $\Delta z_i'$ is the logic AND of $\overline{C}_3$ and $C_4(C_1C_5 + \overline{C}_1\overline{C}_5) + C_1\overline{C}_5$. From the equation (10), $\Delta z_i''$ is equal to $\overline{C}_3$. The block diagram 21 shown in FIG. 2 is the expression of the equations (9) and (10) in terms of the logical elements. In FIG. 2, reference numerals 28, 29, 31, 32, 41 and 42 are AND gates; 30 and 33 are OR gates. When the control unit SPC requests the increment output, logical '1' is applied to one of the inputs of each AND gate 41 and 42 to enable the circuit 21 to use the increments $\Delta z_i'$ and $\Delta z_i''$. The outputs of the logic elements with respect to $C_1$, $C_3$, $C_4$ and $C_5$ are tabulated in Table 2. Table 2 is so designed that the relations between the respective numbers 1 to 10 and $C_1$, $C_3$, $C_4$ and $C_5$ are the same as those in Table 1. When both the tables are compared with each other, those tables are coincident with each other with respect to $C_1$, $C_3$, $C_4$ and $C_5$, and $z_i'$ and $\Delta z_i''$. Therefore, the circuit 21 in FIG. 2 satisfies Table 1. The logic circuit for producing $\Delta z$ for effecting the increment outputting is constructed as mentioned above.

TABLE 1

| No. | $y_i$ | $r_{i-1}$ | $C_1$ | $C_5$ | $C_3$ | $C_4$ | $\Delta z_i'$ | $\Delta z_i''$ | $y_i, r_{i-1}$ |
|---|---|---|---|---|---|---|---|---|---|
| 1 | | | | | 0 | 0 | 0 | 1 | $r_{i-1} < y_i$ |
| 2 | $y_i \geq 0$ | $r_{i-1} \geq 0$ | 0 | 0 | 0 | 1 | 1 | 1 | $r_{i-1} > y_i$ |
| 3 | | | | | 1 | 0 | 0 | 0 | $r_{i-1} = y_i$ |
| 4 | | | | | 0 | 0 | 0 | 1 | $r_{i-1} < y_i$ |
| 5 | $y_i < 0$ | $r_{i-1} < 0$ | 1 | 1 | 0 | 1 | 1 | 1 | $-1 < y_i - r_{i-1} < 0$ |
| 6 | | | | | 1 | 0 | 0 | 0 | $r_{i-1} = y_i$ |
| 7 | | | | | 0 | 0 | 0 | 1 | $0 < y_i - r_{i-1} < 1$ |
| 8 | $y_i \geq 0$ | $r_{i-1} < 0$ | 0 | 1 | 0 | 1 | 0 | 1 | $1 \leq y_i - r_{i-1}$ |
| 9 | | | | | 0 | 0 | 1 | 1 | $y_i - r_{i-1} < -1$ |
| 10 | $y_i < 0$ | $r_{i-1} \geq 0$ | 1 | 0 | 0 | 1 | 1 | 1 | $-1 \leq y_i - r_{i-1} < 0$ |

TABLE 2

| | Control Signal | | | | Logic Elements | | | | | | | | | | | |
|---|---|---|---|---|---|---|---|---|---|---|---|---|---|---|---|---|
| No. | $C_1$ | $C_5$ | $C_3$ | $C_4$ | 25 | 26 | 27 | 28 | 29 | 30 | 31 | 32 | 33 | 34 | $\Delta z_i'$ | $\Delta z_i''$ |
| 1 | 0 | 0 | 0 | 0 | 1 | 1 | 1 | 0 | 1 | 1 | 0 | 0 | 0 | 0 | 0 | 1 |
| 2 | 0 | 0 | 0 | 1 | 1 | 1 | 1 | 0 | 1 | 1 | 0 | 1 | 1 | 1 | 1 | 1 |
| 3 | 0 | 0 | 1 | 0 | 0 | 1 | 1 | 0 | 1 | 1 | 0 | 0 | 0 | 0 | 0 | 0 |
| 4 | 1 | 1 | 0 | 0 | 1 | 0 | 0 | 1 | 0 | 1 | 0 | 0 | 0 | 0 | 0 | 1 |
| 5 | 1 | 1 | 0 | 1 | 1 | 0 | 0 | 1 | 0 | 1 | 0 | 1 | 1 | 1 | 1 | 1 |

TABLE 2-continued

| No. | Control Signal | | | | Logic Elements | | | | | | | | | | $\Delta z_i'$ | $\Delta z_i''$ |
|-----|----|----|----|----|----|----|----|----|----|----|----|----|----|----|----|----|
| | $C_1$ | $C_5$ | $C_3$ | $C_4$ | 25 | 26 | 27 | 28 | 29 | 30 | 31 | 32 | 33 | 34 | | |
| 6 | 1 | 0 | 1 | 0 | 0 | 1 | 0 | 0 | 0 | 0 | 1 | 0 | 1 | 0 | 0 | 0 |
| 7 | 0 | 1 | 0 | 0 | 1 | 0 | 1 | 0 | 0 | 0 | 0 | 0 | 0 | 0 | 0 | 1 |
| 8 | 0 | 1 | 0 | 1 | 1 | 0 | 1 | 0 | 0 | 0 | 0 | 0 | 0 | 0 | 0 | 1 |
| 9 | 1 | 0 | 0 | 0 | 1 | 1 | 0 | 0 | 1 | 1 | 1 | 0 | 1 | 1 | 1 | 1 |
| 10 | 1 | 0 | 0 | 1 | 1 | 1 | 0 | 0 | 1 | 1 | 1 | 1 | 1 | 1 | 1 | 1 |

How to set the A input of the arithmetic logic unit $ALU_2$ will now be described. As indicated by the condition (2) the unit u allowable for quantitizing y is $2^{-15}$. Accordingly, $u=2^{-h}$ may be used as the unit for quantization for an interger h which is $0<h\leq 15$. In this case, the equation (8) is rearranged as follows:

$$I\ \Delta y_i = u \cdot m = 2^{-h} \cdot m \quad (11)$$

In other words, y is inputted into the Y register with the unit of $2^{-h}$. At this time, the shifter SF set the u in the A input of the arithmetic logic unit $ALU_2$ so that $$\Delta z_i = 01 \to u = \overbrace{00\ \ldots\ 010}^{\text{h digit}}\ \overbrace{\ldots\ 0}^{\text{(15-h) digit}} = 2^{-h}$$

$$\Delta z_i = 00 \to u = \overbrace{00\ \ldots\ 0}^{\text{16 digit}} = 0$$

$$\Delta z_i = 11 \to u = \overbrace{11\ \ldots\ 110}^{\text{h digit}}\ \overbrace{\ldots\ 0}^{\text{(15-h) digit}} = -2^{-h}$$

The hardware of the above relations may be realized in such a way that $\Delta z'_i$ is placed to fill the upper bit positions including the h-th bit in the A input, and $\Delta z''_i$ is placed at the (h+1)th bit position, and 0 is placed to fill the remaining lower bit positions.

The operations of the DDA as an integrator and a servo will be described referring again to FIG. 1, together with the logic circuit for producing the increment.

When the control unit SPC directs the circuit to operate as an integrator, the contents $y_i$ of the Y register and the contents $r_{i-1}$ of the R register are read out and the read-out ones are loaded into the latch registers $LH_1$ and $LH_2$, and then are set into the A and B inputs of the arithmetic logic unit $ALU_1$.

After the settings, the increment pulses of independent variable are applied, through the data buses $DB_3$, $DB_4$ or $DB_6$, to the unit $ALU_1$ where the operation is carried out for A+B or A−B i.e. $y_i+r_{i-1}$ or $y_i-r_{i-1}$. The result of the operation is stored as $r_i$ into the R register. In the storing into the R register, the sign bit of the (A±B) is ignored and a positive value $r_i$ given by the equation (4) is always loaded into the R register. The overflow of the R register is determined by the logic circuit LC so as to satisfy the equation (4) by using the sign bit $C_1$ of the $y_i$, the sign bit $C_5$ of $r_{i-1}$ and the sign bit $C_4$ of the output signal from the arithmetic logic unit $ALU_1$ and the increment $\Delta z$ is produced on the basis of the determination.

Accordingly, the generation rule of the increment $\Delta z$ when the DDA operates as an integrator is shown as in Table 3, and its logic circuit is expressed as shown in the block diagram 22 in FIG. 2.

TABLE 3

| No. | $y_i$ | $y_i + r_{i-1}$ | $C_1$ | $C_4$ | $\Delta z_i'$ | $\Delta z_i''$ |
|-----|-------|-----------------|-------|-------|--------------|---------------|
| 1 | $0 \leq y_i$ | $1 \leq y_i + r_{i-1}$ | 0 | 1 | 0 | 1 |
| 2 | $0 \leq y_i$ | $0 \leq y_i + r_{i-1}$ | 0 | 0 | 0 | 0 |
| 3 | $y_i < 0$ | $0 \leq y_i + r_{i-1} < 1$ | 1 | 0 | 0 | 0 |
| 4 | $y_i < 0$ | $y_i + r_{i-1} < 0$ | 1 | 1 | 1 | 1 |

When the control unit SPC specifies a servo, the incremental pulse is generated only dependent on the sign of the $y_i$ and whether $y_i$ is $=0$ or not, as described relating to the equation (5). Therefore, the generation rule of increment $\Delta z$ is given as shown in Table 4 and its logical circuit 23 is expressed as shown in FIG. 2.

TABLE 4

| $y_i$ | $C_1$ | $C_6$ | $\Delta z_i'$ | $\Delta z_i''$ |
|-------|-------|-------|--------------|---------------|
| $y_i > 0$ | 0 | 1 | 0 | 1 |
| $y_i = 0$ | 0 | 0 | 0 | 0 |
| $y_i < 0$ | 1 | 1 | 1 | 1 |

In the block diagram 22, reference numerals 43, 44 and 53, are AND gates. Only when the control unit SPC directs the integrator operation, the SPC applied a signal to one of one of the inputs of each of the AND gate 43 and 44, so that the circuit 22 operates as an integrator to produce increments.

In the block diagram 23, 56, 45 and 46 designate AND gates. When the control unit SPC directs the circuit 23 to operate as a servo, a signal is applied to one of the input terminals of each AND gate 45 and 46, so that it operates as a servo to produce increments.

As seen from the foregoing, the DDA according to the invention is able to produce increments of a signal representing the whole value of the signal from a process when the DDA is applied to the process control. Therefore, the problem of the increment generation of the conventional device can be solved.

An application of the invention will be described. In the DDA of the invention, the Y register portion, particularly the function thereof, is not modified, so that the inputting of the increment input $\Delta y_k$ and the directly inputting of the whole value from exterior are performed in the same way as that of the other DDA devices. Accordingly, the $\Delta y_k$ may be defined as shown in FIG. 8. In FIG. 8, an increment of y is expressed by $$\sum_{k=1}^{n} y_k \text{ and hence } \Delta z = \sum_{k=1}^{n} y_k.$$

In other words, the total sum of n input increments is outputted as an output increment. Therefore, the DDA serves as an adder. The conventional adder uses a servo, as shown in FIG. 9. In this case, of the inputs $\Delta y_k$, the n-th input is used to negatively feed back $\Delta z$. The servo continues to output $\Delta z$ until the total sum of the increment inputs $\Delta y_i \sim \Delta y_{n-1}$ is cancelled by the input $\Delta y_n$. Therefore, when it produces $\Delta z$ equal to the total sum of the increment inputs $\Delta y_1$ to $\Delta y_{n-1}$, $y=0$ is established and the generation of the increment $\Delta z$ stops. However, since the whole value is not accumulated in the Y register, the Y register can not produce a signal corresponding to the whole value to an external device and the maximum number of the input increments to be added is $n-1$. On the other hand, in the present invention, since the whole value is accumulated in the adder, the R register can produce the whole value to an external device and the maximum number of the input increments to be added is n. Therefore, the device according to the invention may be used not only for inputting a signal of the whole value delivered from the process but also for outputting a control signal of the whole value to the process.

I claim:

1. A digital differential analyzer having a function of producing an increment of a time-variable input signal and comprising:
  a first latch register for latching first data representing an instant value of said input signal at a predetermined timing,
  a first register for storing second data whose value is renewed when a new value of said second data is applied thereto,
  a second latch register coupled to said first register for latching the second data stored in said first register,
  a first arithmetic logic unit coupled to said first and second latch registers for performing a first operation in which a first value represented by said first data latched in said first latch register has subtracted therefrom a second value represented by said second data latched in said second latch register, and for performing a second operation which determines whether or not said first value is equal to said second value,
  a logic circuit coupled to said first and second latch registers and said first arithmetic logic unit for determining whether or not any increment is present in said first value with respect to said second value, and for determining the sign of any such increment from the signs of said first and second values, the sign of the result of said first operation and the determination by said second operation,
  a second register coupled to said logic circuit for storing a first signal indicative of the sign of said increment determined by said logic circuit,
  a third register coupled to said logic circuit for storing a second signal indicative of the result of the determination by said logic circuit as to the presence of any increment in said first value,
  a second arithmetic logic unit coupled to said second and third registers for performing a third operation in which the value of said second data latched in said second latch register is modified by an increment determined according to said first and second signals stored in said second and third registers, and
  means coupled between said second arithmetic logic unit and said first register for renewing the value of said second data stored in said first register by the result of said third operation.

2. An analyzer according to claim 1, in which said third operation is effective to modify the value of said second data by a unit increment when said second signal indicates that there exists any increment in said first value with respect to said second value.

3. An analyzer according to claim 2, further comprising means coupled between said second and third registers and said second arithmetic logic unit for adjusting the amount of said unit increment relative to the value of said second data.

4. An analyzer according to claim 1, further comprising a fourth register for receiving and storing an instant value of said time-variable input signal and means for supplying the stored instant value to said first latch register at said predetermined timing.

5. An analyzer according to claim 4, further comprising an adder coupled to said fourth register and said second and third registers for adding to the contents of said fourth register a value of an increment stored in said second and third registers as determined according to said first and second signals.

6. A method for producing an increment of a time-variable input signal by using a digital differential analyzer having a register whose content is initially set to zero, comprising the steps of:
  introducing to said digital differential analyzer an instant value of said time-variable input signal,
  effecting a first operation in which the difference between said introduced instant value and the content of said register is determined,
  effecting a second operation which determines whether or not said introduced instant value is equal to the content of said register,
  determining whether or not there exists any increment in said introduced instant value with respect to the content of said register, and determining the sign of any such increment from the results of said first and second operations,
  producing a sum of the content of said register and a predetermined unit value depending on the results of said determining step,
  renewing the content of said register by the result of said sum producing step, and
  repeating the above-mentioned steps from said instant value introducing step.

* * * * *